(12) United States Patent
Blanchard et al.

(10) Patent No.: US 10,384,694 B2
(45) Date of Patent: Aug. 20, 2019

(54) BEARING UNIT FOR AN AXLEBOX OF A RAILWAY VEHICLE, AXLEBOX, RAILWAY VEHICLE AND MAINTENANCE PROCESS

(71) Applicant: Aktiebolaget SKF, Gothenburg (SE)

(72) Inventors: Xavier Blanchard, Saint-Cyr-sur-Loire (FR); Thierry Le Moigne, Luynes (FR)

(73) Assignee: Aktiebolaget SKF, Göteborg (SE)

( * ) Notice: Subject to any disclaimer, the term of this patent is extended or adjusted under 35 U.S.C. 154(b) by 249 days.

(21) Appl. No.: 15/326,324

(22) PCT Filed: Jul. 17, 2014

(86) PCT No.: PCT/EP2014/065423
§ 371 (c)(1),
(2) Date: Jan. 13, 2017

(87) PCT Pub. No.: WO2016/008531
PCT Pub. Date: Jan. 21, 2016

(65) Prior Publication Data
US 2017/0203773 A1    Jul. 20, 2017

(51) Int. Cl.
*B61F 15/20* (2006.01)
*F16C 35/077* (2006.01)

(52) U.S. Cl.
CPC ............ *B61F 15/20* (2013.01); *F16C 35/077* (2013.01); *F16C 2226/50* (2013.01); *F16C 2326/10* (2013.01)

(58) Field of Classification Search
CPC ...... B61F 5/00; B61F 5/14; B61F 5/26; B61F 5/28; B61F 5/30; B61F 15/00; B61F 15/02; B61F 15/12; B61F 15/20
See application file for complete search history.

(56) References Cited

U.S. PATENT DOCUMENTS 2,811,396 A    10/1957   Milliger et al.
2,981,574 A *  4/1961   McNicoll ............... B61F 15/12
                                                   384/459

FOREIGN PATENT DOCUMENTS

| CN | 2763621 Y    | 3/2006 |
| CN | 103174756 A  | 6/2013 |
| EP | 1398636 A2   | 3/2004 |
| EP | 2607733 A1   | 6/2013 |
| WO | 9811356 A1   | 3/1998 |

* cited by examiner

*Primary Examiner* — Robert J McCarry, Jr.
(74) *Attorney, Agent, or Firm* — Bryan Peckjian; SKF USA Inc. Patent Dept.

(57) ABSTRACT

The invention concerns a bearing unit for an axlebox of a railway vehicle. The bearing unit being centered on a central axis and having a bearing configured to support an axle of a wheelset. The bearing unit also includes an annular sleeve provided with an outer periphery configured for mounting in an annular bore of a housing of the axlebox and an inner periphery configured for receiving the bearing; and a plurality of anti-rotation means distributed at the outer periphery of the annular sleeve, for preventing rotation of the annular sleeve in the housing of the axlebox. The invention also concerns a railway vehicle having such an axlebox and a maintenance process for such an axlebox.

13 Claims, 6 Drawing Sheets

BEARING UNIT FOR AN AXLEBOX OF A RAILWAY VEHICLE, AXLEBOX, RAILWAY VEHICLE AND MAINTENANCE PROCESS

CROSS REFERENCE

This is a United States National Stage Application claiming the benefit of International Application Number PCT/EP2014/065423 filed on Jul. 17, 2014, which is incorporated herein by reference in its entirety.

FIELD OF THE INVENTION

The invention concerns a bearing unit for an axlebox of a railway vehicle. The invention also concerns an axlebox comprising such a bearing unit, a railway vehicle comprising at least one such axlebox, and a maintenance process for such an axlebox.

BACKGROUND OF THE INVENTION

In a known manner, axleboxes are mounted on railway vehicles such as trains, in particular on passenger coaches and freight cars. Generally, a railway vehicle includes several bogies. Each bogie comprises a frame, two wheelset and four axleboxes. Each wheelset comprises an axle supporting two wheels. The axlebox is the linking element between the rotating wheelset and the quasi-static frame of the bogie. The axlebox comprises a housing receiving a bearing unit. The housing is mounted for the lifetime of the bogie, by example thirty years, while the bearing is dismounted from the wheelset on a regular basis, for example every one million kilometers or every one or two years.

To facilitate maintenance operations, it is known to provide the axlebox with a split housing in two parts, by example an upper arm and a lower arm, or in three parts including a sleeve protecting the bearing unit. The split housing enables an easy radial dismounting of the wheelset, with the bearing and the axle which remain assembled.

U.S. Pat. No. 2,811,396 discloses two embodiments of an axlebox, having a generally rectangular cross section. In the embodiment of FIGS. 6 to 8, the axlebox comprises an upper casing part, a bottom casing part formed by a removable plate, a bearing receiving the axle of a wheelset, a rectangular sleeve protecting the bearing unit, and a resilient material disposed between the sleeve and the upper casing part.

BRIEF SUMMARY OF THE INVENTION

The aim of the invention is to provide an improved axlebox.

To this end, the invention concerns a bearing unit, for an axlebox of a railway vehicle, the bearing unit being centered on a central axis and comprising a bearing configured to support an axle of a wheelset. According to the invention, the bearing unit also comprises: an annular sleeve provided with an outer periphery configured for mounting in an annular bore of a housing of the axlebox and an inner periphery configured for receiving the bearing; and a plurality of anti-rotation means distributed at the outer periphery of the annular sleeve, for preventing rotation of the annular sleeve in the housing of the axlebox.

Thanks to the invention, the lifetime of the bearing unit can be improved. The annular shape of the sleeve allows a better distribution of the load between the housing and the bearing unit than a rectangular sleeve. The anti-rotation means can be formed integral with the annular sleeve or fastened to the annular sleeve.

Moreover, since anti-rotation means are distributed along the outer periphery of the annular sleeve the position of the anti-rotation means can be modified during maintenance operations by dismounting the bearing unit, then turning the bearing unit around its central axis. The sleeve zone that supports the load is changed at each maintenance operation and it is not the same restricted zone that supports the load during the entire life of the said sleeve. The load is then shared on the whole sleeve periphery during the sleeve life that permits to reduce the fretting corrosion and to increase the lifetime.

According to further aspects of the invention which are advantageous but not compulsory, such a bearing unit may incorporate one or several of the following features:

The plurality of anti-rotation means include at least two plane surfaces formed at the outer periphery of the annular sleeve.

The plane surfaces are located between cylindrical surfaces formed at the outer periphery of the annular sleeve.

The plane surfaces extend along angular sectors, which are defined by a common angle and are regularly spaced around the central axis.

The plurality of anti-rotation means include at least two recesses formed at the outer periphery of the annular sleeve.

The recesses have a U-shape opened at the outer periphery of the annular sleeve.

The plurality of anti-rotation means are machined on the annular sleeve.

The annular sleeve comprises a central portion and two lateral portion, the plurality of anti-rotation means being formed on the two lateral portions.

The plurality of anti-rotation means include: at least two threaded holes opened at a lateral surface of the annular sleeve; an anti-rotation member; and fastening means for fastening the anti-rotation member to the threaded holes.

The anti-rotation means formed on the annular sleeve are regularly spaced around the central axis.

All the anti-rotation means formed on the annular sleeve have a common construction.

Only part of the anti-rotation means is likely to be subjected to mechanical strain, when the annular sleeve is mounted in the housing of the axlebox.

The invention also concerns an axlebox, comprising a housing and a bearing unit as mentioned here-above.

Advantageously, the housing of the axlebox comprises complementary means for cooperating with the anti-rotation means of the sleeve so as to prevent the rotation of the annular sleeve.

Preferably, the housing of the axlebox comprises one unique complementary means that cooperates with only one of the anti-rotation means of the annular sleeve.

The invention also concerns a railway vehicle, comprising at least one axlebox as mentioned here-above.

The invention also concerns a maintenance process, for an axlebox as mentioned here-above. The process comprising the following steps:

a step of dismounting the bearing unit out of the housing;

a step of turning the bearing unit of a predetermined angle, so that new anti-rotation means take place of previous anti-rotation means around the central axis; and a step of mounting the bearing unit in the housing, so that the new anti-rotation means cooperate with the housing in place of the previous anti-rotation means.

BRIEF DESCRIPTION OF THE SEVERAL VIEWS OF THE DRAWING

The invention will now be explained in correspondence with the annexed figures, and as an illustrative example, without restricting the object of the invention. In the annexed figures.

DETAILED DESCRIPTION OF THE INVENTION

Figure 1:
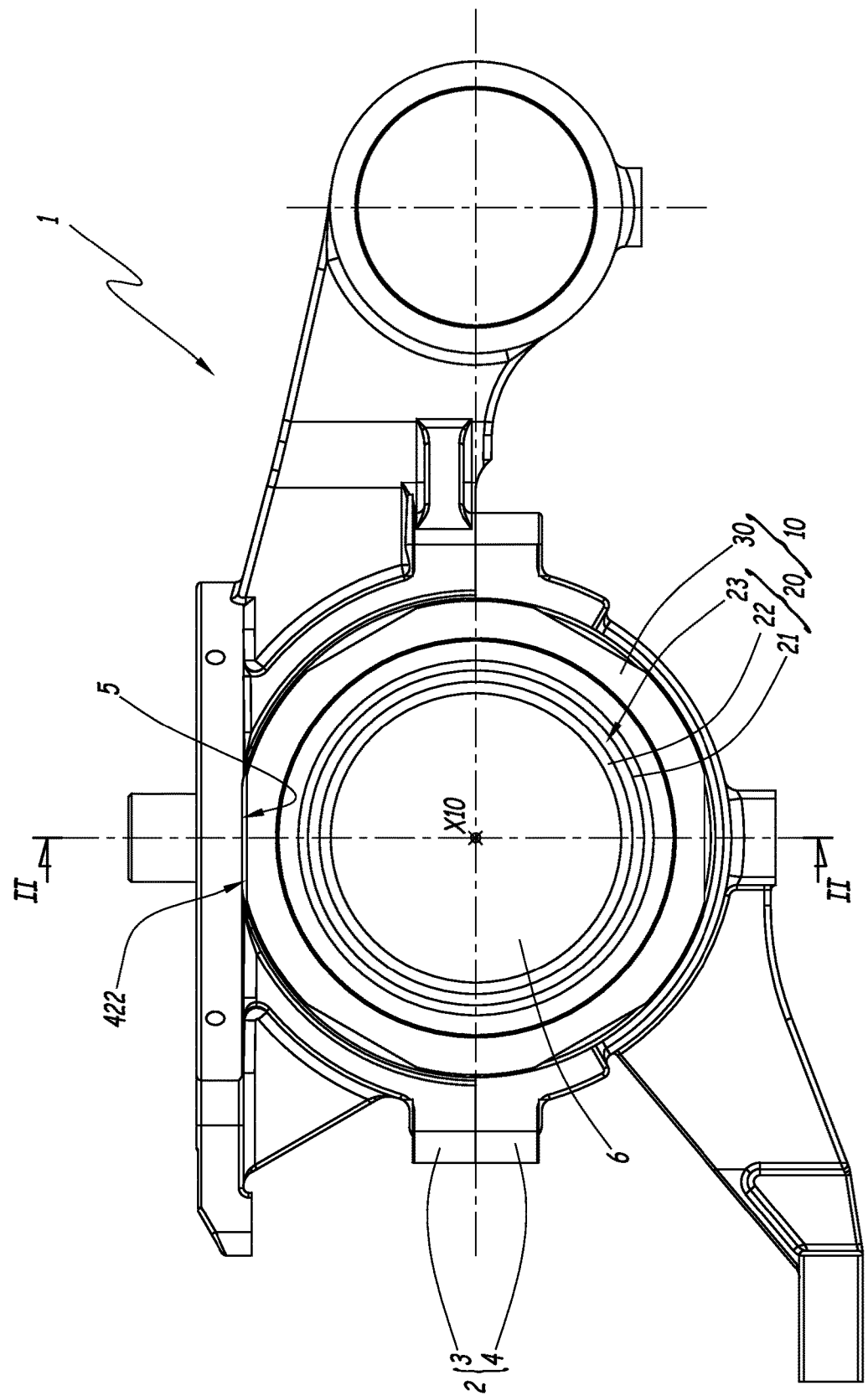
FIG. 1 is a front view of an axlebox according to the invention, comprising a bearing unit which is also according to the invention and which includes a bearing and sleeve.
Figure 2:
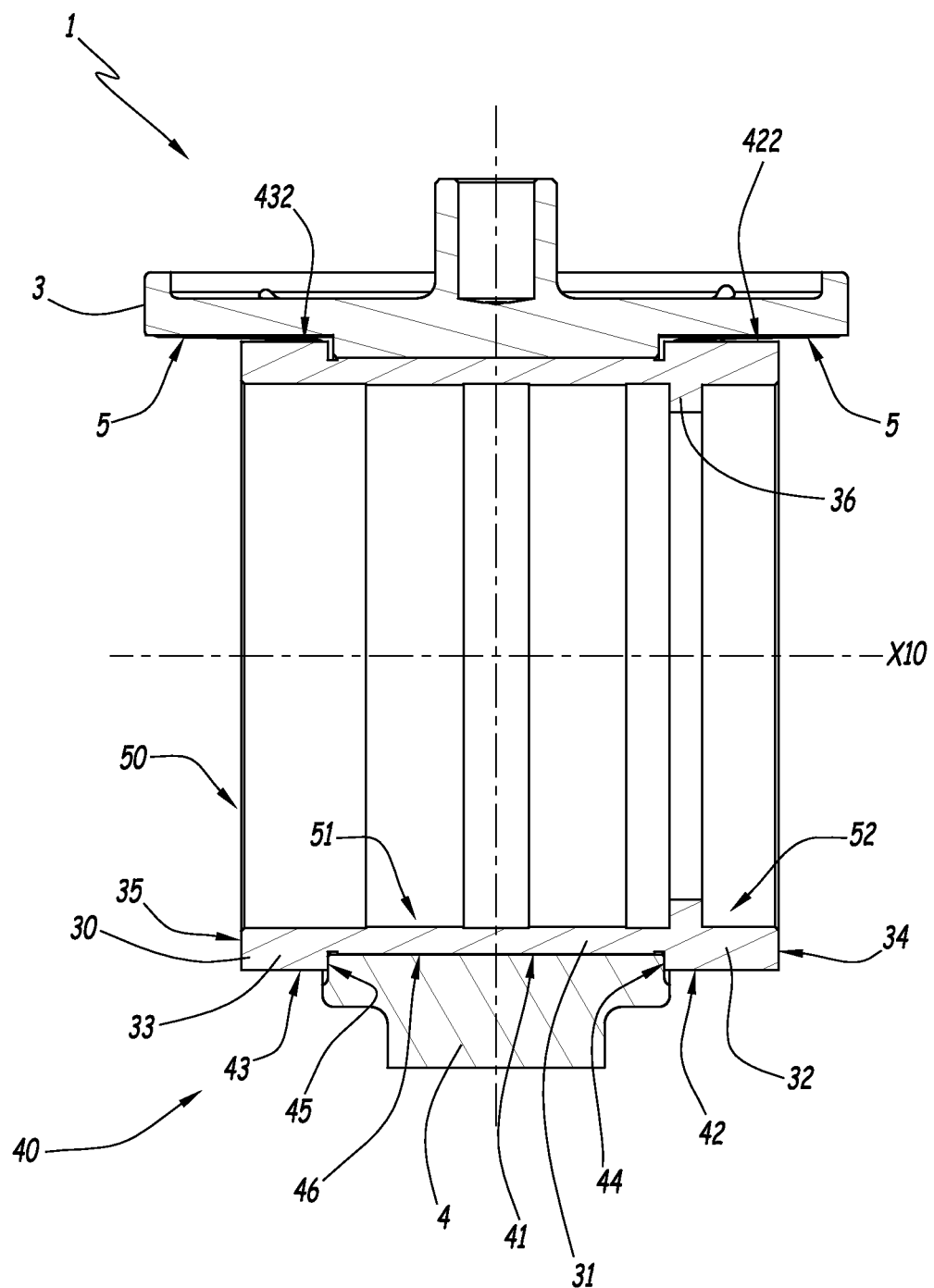
FIG. 2 is a sectional view along line II-II of FIG. 1, the bearing being not shown.
Figure 3:
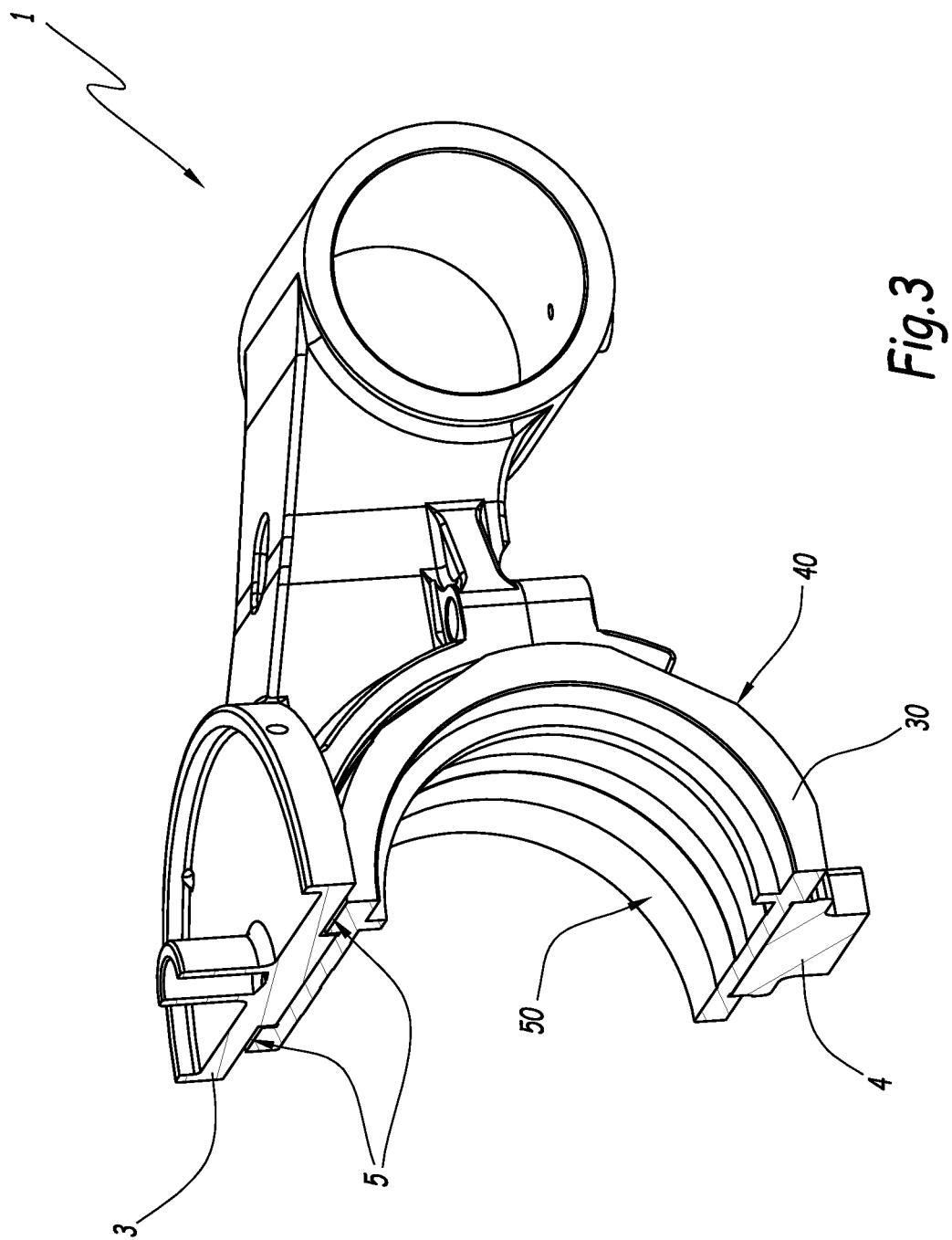
FIG. 3 is a perspective view of the axlebox, with a section along line II-II of FIG. 1, the bearing being not shown.
Figure 4:
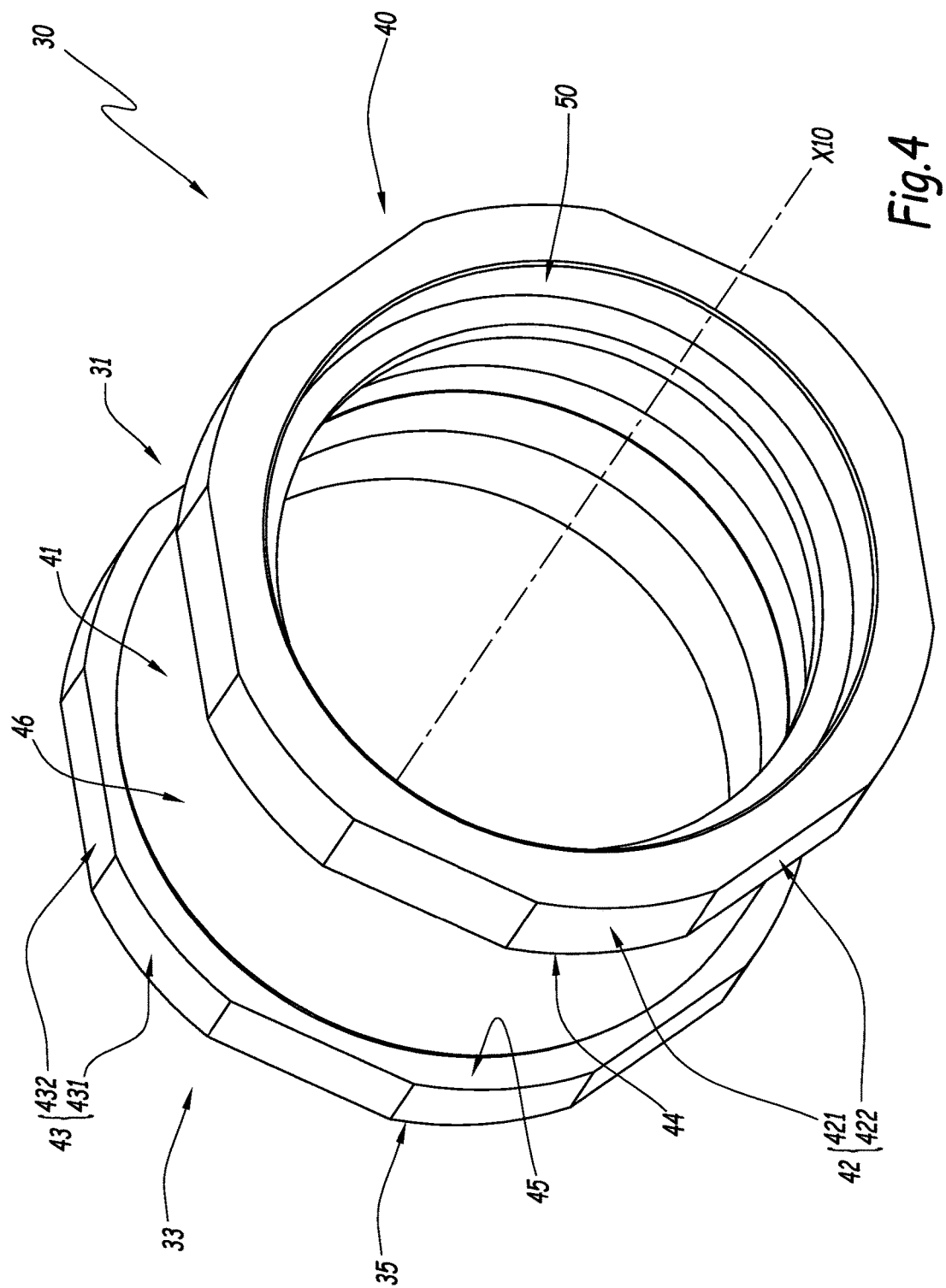
FIG. 4 is a perspective view of the sleeve shown on FIGS. 1 to 3.

FIGS. 1 to 4 show an axlebox 1 according to a first embodiment of the invention.

Axlebox 1 comprises housing 2 and a bearing unit 10, which is also according to the invention. Housing 2 comprises an upper arm 3 and a lower arm 4. Upper arm 3 is a first housing part fixed to the frame of the bogie, while lower arm 4 is a second housing part movable relative to the frame of the bogie. Arms 3 and 4 are connected by bolts, not shown, on both sides of axlebox 1. In an upper load area, upper arm 3 comprises plane surfaces 5 facing bearing unit 10. Except plane surfaces 5, housing 2 comprises cylindrical surfaces facing bearing unit 10.

Bearing unit 10 is mounted in housing 2, between arms 3 and 4. Bearing unit 10 comprises a bearing 20 and an annular sleeve 30, centered on a central axis X10. When bearing unit 10 is mounted in axlebox 1, sleeve 30 is clamped between arms 2 and 3, while bearing 20 is mounted in sleeve 30 and receives an axle 6 belonging to the wheelset. Axle 6 and bearing 20 are represented schematically only on FIG. 1 for simplification purpose.

Bearing 20 comprises an outer ring 21 configured to be fixed to sleeve 30 and an inner ring 22 configured to be mounted on axle 6. Bearing 20 has a raceway 23 delimited between outer ring 21 and inner ring 22. Raceway 23 receives rolling elements, by example rollers, balls or needles, not shown for simplification purpose. Bearing 20 may be a spherical roller bearing, including two rows of rollers. Alternatively, bearing 20 may be of any type adapted to the present application.

Annular sleeve 30 has a globally cylindrical tubular shape, centered on axis X10. Sleeve 30 comprises an outer periphery 40 and an inner periphery 50, each extending in a direction globally parallel to axis X10. Outer periphery 40 is formed opposite axis X10, while inner periphery faces axis X10. Outer periphery 40 is configured for mounting in the annular bore of housing 2. Sleeve 30 comprises a central portion 31 interposed between two lateral portions 32 and 33 along axis X10. Sleeve 30 comprises two end faces 34 and 35, each having a plane annular shape, formed respectively on portion 32 and 33. Sleeve 30 also comprises a radial portion 36, extending from portion 32 toward axis X10 at its inner periphery 50.

Inner periphery 50 of sleeve 30 comprises a portion 51 for receiving bearing 20 and a portion 52 for receiving a cover, not shown. Portions 51 and 52 are separated by radial portion 36.

Outer periphery 40 of sleeve 30 comprises several surfaces 41, 42, 43, 44 and 45. Surface 41 is the outer cylindrical surface of central portion 31. Surfaces 42 and 43 are outer surfaces of lateral portions 32 and 33, respectively. Surface 44 is a radial surface extending between surfaces 41 and 42, while surface 45 is a radial surface extending between surfaces 41 and 43. Surfaces 41, 44 and 46 delimit an annular groove 46, receiving arms 3 and 4 when sleeve 30 is mounted in housing 2. At the outer periphery 40 of sleeve 30, surface 42 includes cylindrical surfaces 421 and plane surfaces 422, while surface 43 includes cylindrical surfaces 431 and plane surfaces 432. Surfaces 422 are distinct from each other. Surfaces 432 are distinct from each other.

On the example of FIGS. 1 to 4, portion 32 is provided with six cylindrical surfaces 421 and six plane surfaces 422 arranged alternately around X10, while portion 33 is provided with six cylindrical surfaces 431 and six plane surfaces 432 arranged alternately around X10. Planes surfaces 422 and 432 are preferably machined on the outer periphery 40 of sleeve 30. Plane surfaces 422 and 432 extend along angular sectors, which are regularly spaced around axis X10 and are defined by a common angle, equal to 30 degrees on the example of FIGS. 1 to 4. Alternatively, sleeve 30 may be provided with a different number of plane surfaces 422 and 432.

When sleeve 30 is mounted in housing 2, its outer periphery 40 is configured such that at least some of the plane surfaces 422 and 432 can cooperate mechanically with complementary portions of housing 2, in order to prevent rotation of sleeve 30 relative to housing 2. On the example of FIGS. 1 to 4, one plane surface 422 and one plane surface 432 are configured to come in contact with the plane surfaces 5 provided on upper arm 3. In other words, surfaces 422 and 432 constitute anti-rotation means formed on sleeve 30, while the surfaces 5 constitute anti-rotation means belonging to housing 2.

The invention also concerns a maintenance process for axlebox 1, comprising the following successive steps a), b) and c).

During a maintenance operation, an operator checks the wear of sleeve 30 and housing 2, particularly in the load areas. In practice, the following maintenance process may be performed only when a certain amount of wear is detected. Alternatively, the following maintenance process may be performed as a preventive measure during maintenance operation.

In step a), bearing unit 10 is dismounted out of housing 2 by the operator. In step b), the operator turns bearing unit 10 of a predetermined angle around axis X10, so that new plane surfaces 422 and 432 take place of previous plane surfaces 422 and 432 facing plane surfaces 5. In step c), bearing unit 10 is mounted in housing 2 by the operator, so that the new plane surfaces 422 and 432 form anti-rotation means likely to cooperate with plane surfaces 5 of housing 2 in place of the previous plane surfaces 422 and 432.

At this stage, we note that only part of the anti-rotation means 422 and 432 is likely to cooperate with housing 2 and thus be subjected to mechanical strain, when annular sleeve 30 is mounted in housing 2. After each maintenance operation, another part of sleeve 30 forms anti-rotation means likely to be subjected to mechanical strain. This provides "fresh" surfaces of contact between sleeve 30 and housing 2 until next maintenance operation. Thus, lifetime of bearing unit 10 is improved.

Figure 5:
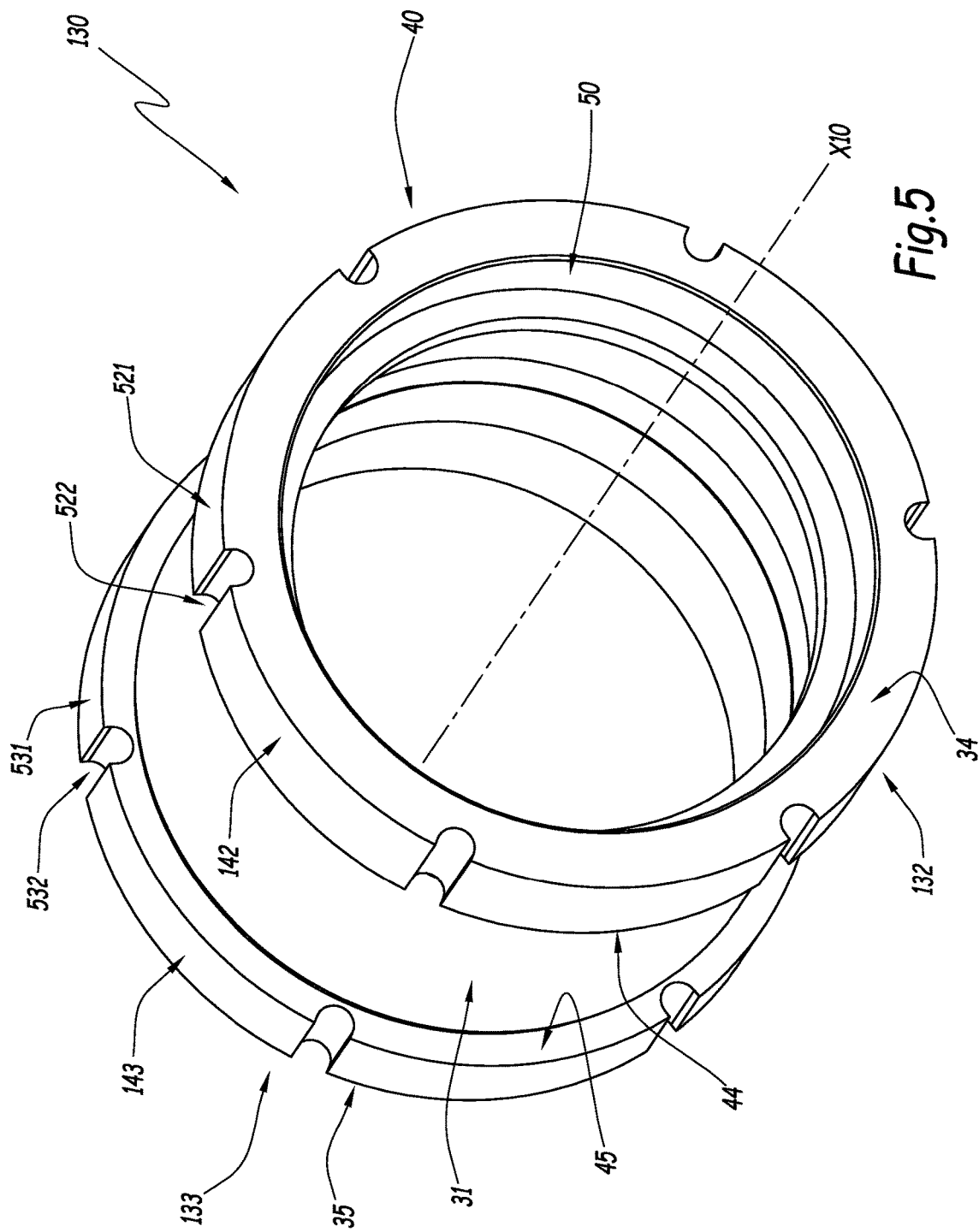
FIG. 5 is a view similar to FIG. 4, showing a sleeve according to a second embodiment of the invention.
Figure 6:
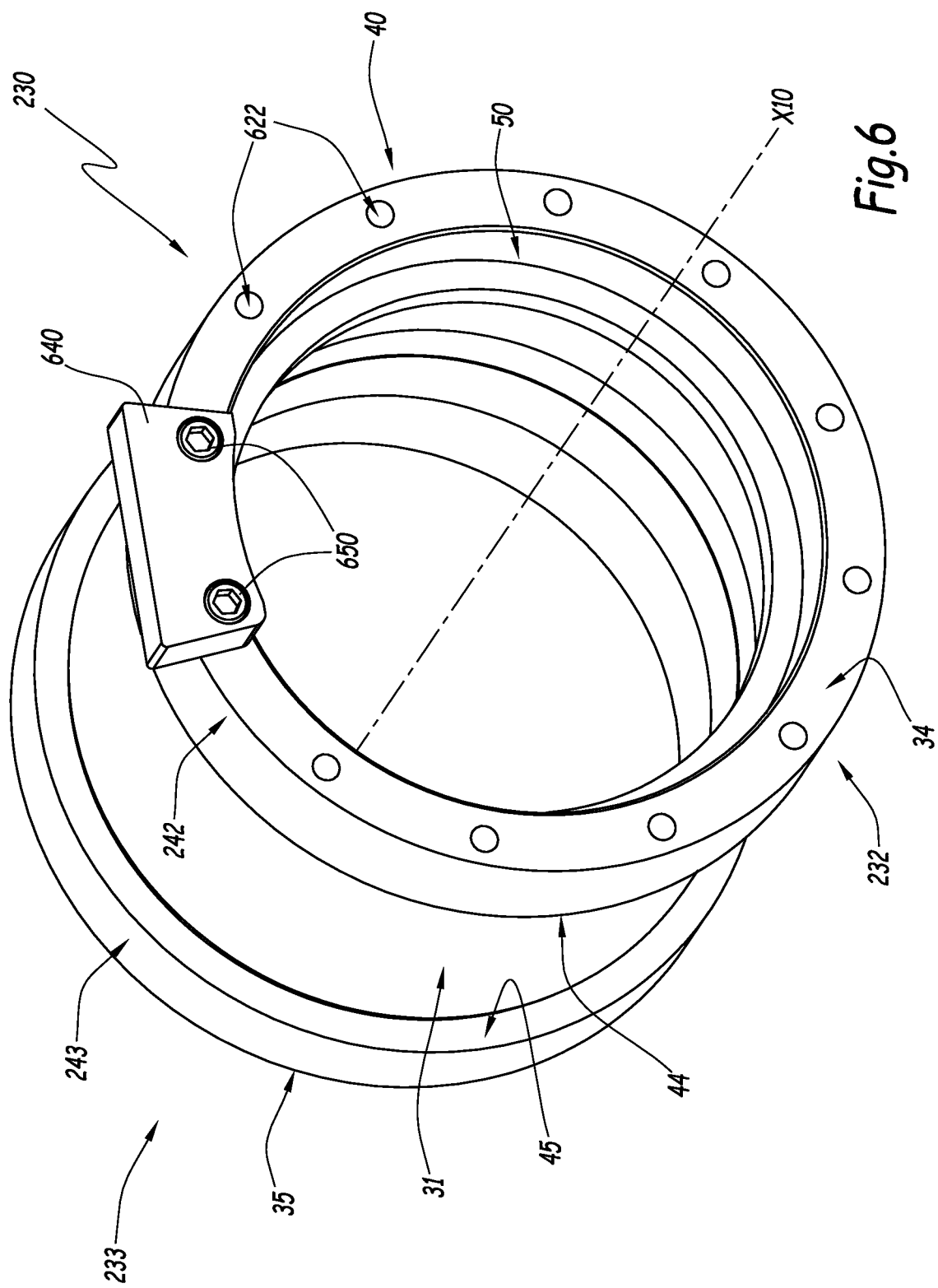
FIG. 6 is a view similar to FIG. 4, showing a sleeve according to a third embodiment of the invention.

Other embodiments of the invention are represented on FIGS. 5 and 6. In these embodiments, elements similar to the first embodiment have the same references and work in the same way. Only the differences with respect to the first embodiment are described hereafter.

FIG. 5 shows an annular sleeve 130 comprising two lateral portions 132 and 133. Portions 132 and 133 have cylindrical outer surfaces 142 and 143, respectively. Portion 132 are provided with recesses 522 and 532, respectively. Each recess 522 or 532 has a U-shape opened at the outer periphery 40. Moreover, recesses 522 are opened at surfaces 34 and 44, while recesses are opened at surfaces 35 and 45. Recesses 522 are separated by cylindrical portions 521 of surface 142, while recesses 532 are separated by cylindrical portions 531 of surface 143. Recesses 522 and 532 are preferably machined on the outer periphery 40 of sleeve 130.

Recesses 522 and 532 are configured to receive pins or screws, not shown, fastened to housing 2. Thus, recesses 522 and 532 can cooperate mechanically with those pins or screws, in order to prevent rotation of sleeve 130 relative to housing 2.

In step b) of the maintenance process, the operator turns bearing unit 10 of a predetermined angle around axis X10, so that new recesses 522 and 532 take place of previous recesses 522 and 532, for cooperating with the pins or screws fastened to housing 2.

In the embodiment of FIG. 5, the anti-rotation means of bearing unit 10 include recesses 522 and 532. Housing 2 is provided with complementary anti-rotation elements, not shown, by example pins or screws. Recesses 522 and 532 are anti-rotation means formed on sleeve 130, while the pins or screws are anti-rotation means fastened to housing 2.

FIG. 6 shows an annular sleeve 230 comprising two lateral portions 232 and 233. Portions 232 and 233 have cylindrical outer surfaces 242 and 243, respectively. Portion 232 is provided with threaded holes 622 opened at the lateral surface 34 of sleeve 230. More precisely, sleeve 230 is provided with twelve threaded holes 622, distributed every 30 degrees around axis X10. Similarly, portion 233 may be provided with threaded holes opened at the lateral surface 35 of sleeve 230.

Holes 622 receive screws 650 for fastening a plate 640 to sleeve 230. More precisely, two holes 622 receive two screws 650 mounted through plate 640. Plate 640 extends further than surface 242 at the outer periphery of sleeve 230, in a radial direction away from axis X10. Thus, plate 640 can cooperate mechanically with housing 2, more precisely with a complementary part belonging or fastened to housing 2, such as plane surfaces 5, in order to prevent rotation of sleeve 230 relative to housing 2.

In step b) of the maintenance process, the operator turns bearing unit 10 of a predetermined angle around axis X10, so that new threaded holes 622 take place of previous threaded holes 622, and that plate 640 is mounted in these new threaded holes 622, for cooperating with housing 2. If plate 640 is worn, it can be replaced by a new plate 640, without needing to replace the whole sleeve 230.

In the embodiment of FIG. 6, the anti-rotation means of bearing unit 10 include threaded holes 622, plate 640 and screws 650. Holes 622 are anti-rotation means formed on sleeve 230, while plate 640 and screws 650 are anti-rotation means fastened to sleeve 230. Alternatively, the anti-rotation means may be provided with an anti-rotation member different from plate 640 and/or with fastening means different from screws 650. By example, the anti-rotation member may be a cover fastened to lateral surface 34 and provided with at least one plane surface for cooperating with housing 2. The anti-rotation means include at least two threaded holes 622, preferably several threaded holes 622 distributed around axis X10.

Other non-shown embodiments can be implemented within the scope of the invention. In particular, the anti-rotation means disposed at the outer periphery 40 of annular sleeve 30, 130 or 230 may have configurations different from FIGS. 1 to 6. Preferably, for simplification purpose, all the anti-rotation means formed on annular sleeve 30, 130 or 230 have the same construction.

Whatever the embodiment, bearing unit 20 comprises an annular sleeve and anti-rotation means disposed at the outer periphery of the annular sleeve, for preventing rotation of the annular sleeve in housing 2 of axlebox 1.

In addition, technical features of the different embodiments can be, in whole or part, combined with each other. Thus, axlebox 1 and bearing unit 10 can be adapted to the specific requirements of the application.

The invention claimed is:

1. A bearing unit, for an axlebox of a railway vehicle, the bearing unit-being centered on a central axis and having a bearing configured to support an axle of a wheelset, the bearing unit comprising:
   an annular sleeve provided with an outer periphery configured for mounting in an annular bore of a housing of the axlebox and an inner periphery configured for receiving the bearing; and
   a plurality of anti-rotation means distributed at the outer periphery of the annular sleeve, for preventing rotation of the annular sleeve in the housing of the axlebox.

2. The bearing unit according to claim 1, wherein the plurality of anti-rotation means include at least two plane surfaces formed at the outer periphery of the annular sleeve.

3. The bearing unit according to claim 2, wherein the plane surfaces are located between cylindrical surfaces formed at the outer periphery of the annular sleeve.

4. The bearing unit according to claim 2, wherein the plane surfaces extend along angular sectors, which are defined by a common angle and are regularly spaced around the central axis.

5. The bearing unit according to claim 1, wherein the plurality of anti-rotation means are machined on the annular sleeve.

6. The bearing unit according to claim 1, wherein the annular sleeve comprises a central portion and two lateral portions, the plurality of anti-rotation means being formed on the two lateral portions.

7. The bearing unit according to claim 1, wherein the anti-rotation means formed on the annular sleeve are regularly spaced around the central axis.

8. The bearing unit according to claim 1, wherein all the anti-rotation means formed on the annular sleeve have a common construction.

9. The bearing unit according to claim 1, wherein only part of the anti-rotation means subjected to mechanical strain, when the annular sleeve is mounted in the housing of the axlebox.

10. A bearing unit, for an axlebox of a railway vehicle, the bearing unit-being centered on a central axis and having a bearing configured to support an axle of a wheelset, the bearing unit comprising:

an annular sleeve provided with an outer periphery configured for mounting in an annular bore of a housing of the axlebox and an inner periphery configured for receiving the bearing; and a plurality of anti-rotation means distributed at the outer periphery of the annular sleeve, for preventing rotation of the annular sleeve in the housing of the axlebox, wherein the plurality of anti-rotation means include:

at least two threaded holes opened at a lateral surface of the annular sleeve;

an anti-rotation member; and fastening means for fastening the anti-rotation member to the threaded holes.

11. An axlebox comprising;

a housing, and a bearing unit being centered on a central axis and having a bearing configured to support an axle of a wheelset, an annular sleeve provided with an outer periphery configured for mounting in an annular bore of a housing of the axlebox and an inner periphery configured for receiving the bearing; and a plurality of anti-rotation means distributed at the outer periphery of the annular sleeve, for preventing rotation of the annular sleeve in the housing of the axlebox, wherein the plurality of anti-rotation means include at least two recesses formed at the outer periphery of the annular sleeve, and wherein the recesses are U-shape at the outer periphery of the annular sleeve.

12. A maintenance process, for an axlebox having a housing, and a bearing unit being centered on a central axis and having a bearing configured to support an axle of a wheelset, an annular sleeve provided with an outer periphery configured for mounting in an annular bore of a housing of the axlebox and an inner periphery configured for receiving the bearing; and a plurality of anti-rotation means distributed at the outer periphery of the annular sleeve, for preventing rotation of the annular sleeve in the housing of the axlebox, the process comprising the following steps:

a) a step of dismounting the bearing unit out of the housing;

b) a step of turning the bearing unit of a predetermined angle, so that new anti-rotation means take place of previous anti-rotation means around the central axis; and c) a step of mounting the bearing unit in the housing, so that the new anti-rotation means cooperates with the housing in place of the previous anti-rotation means.

13. A bearing unit, for an axlebox of a railway vehicle, the bearing unit-being centered on a central axis and having a bearing configured to support an axle of a wheelset, the bearing unit comprising:

an annular sleeve provided with an outer periphery configured for mounting in an annular bore of a housing of the axlebox and an inner periphery configured for receiving the bearing; and a plurality of anti-rotation means distributed at the outer periphery of the annular sleeve, for preventing rotation of the annular sleeve in the housing of the axlebox, wherein the plurality of anti-rotation means include at least two recesses formed at the outer periphery of the annular sleeve, wherein the recesses are U-shape at the outer periphery of the annular sleeve.

* * * * *